US012367806B2

(12) United States Patent
Kim et al.

(10) Patent No.: US 12,367,806 B2
(45) Date of Patent: Jul. 22, 2025

(54) TIMING CONTROLLER OF DISPLAY APPARATUS CONTROLLING OVERDRIVING OF DISPLAY DATA

(71) Applicant: LX Semicon Co., Ltd., Daejeon (KR)

(72) Inventors: Do Seok Kim, Daejeon (KR); Won Sik Chae, Daejeon (KR); Su Jin Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 274 days.

(21) Appl. No.: 17/893,001

(22) Filed: Aug. 22, 2022

(65) Prior Publication Data

US 2023/0104328 A1 Apr. 6, 2023

(30) Foreign Application Priority Data

Oct. 5, 2021 (KR) ........................ 10-2021-0131771

(51) Int. Cl.
*G06F 3/038* (2013.01)
*G09G 3/20* (2006.01)

(52) U.S. Cl.
CPC ... *G09G 3/2096* (2013.01); *G09G 2310/0291* (2013.01); *G09G 2320/0257* (2013.01); *G09G 2320/0626* (2013.01); *G09G 2340/0435* (2013.01); *G09G 2360/16* (2013.01)

(58) Field of Classification Search
CPC ......... G09G 3/2096; G09G 2310/0291; G09G 2320/0257; G09G 2320/0626
USPC .......................................................... 345/204
See application file for complete search history.

(56) References Cited

U.S. PATENT DOCUMENTS

2006/0103682 A1* 5/2006 Kunimori ............ G09G 3/3611 345/690
2015/0115826 A1* 4/2015 Koo ..................... G09G 3/3266 315/210
2017/0124934 A1* 5/2017 Verbeure .............. G09G 3/3611
2019/0189082 A1* 6/2019 Shehata ................. G09G 5/026
2020/0193924 A1 6/2020 Pai et al.
2022/0036844 A1* 2/2022 Chen ........................ G09G 3/36

FOREIGN PATENT DOCUMENTS

KR 2008-0049543 A 6/2008
KR 2018-0062332 A 6/2018

* cited by examiner

*Primary Examiner* — Jonathan M Blancha
(74) *Attorney, Agent, or Firm* — POLSINELLI PC

(57) ABSTRACT

The present disclosure discloses a timing controller of a display device having an overdriving function. The timing controller includes a data reception circuit configured to receive display data, an overdriving circuit configured to perform overdriving on display data, and a data transmission circuit configured to transit overdriven display data.

10 Claims, 4 Drawing Sheets

TIMING CONTROLLER OF DISPLAY APPARATUS CONTROLLING OVERDRIVING OF DISPLAY DATA

BACKGROUND

1. Technical Field

Various embodiments generally relate to a timing controller of a display apparatus, and more particularly, to a timing controller of a display apparatus capable of actively responding to a refresh rate changed depending on a frame frequency.

2. Related Art

LCD panels and OLED panels are widely used as display panels. An LCD panel constitutes a pixel by an LCD element, and an OLED panel constitutes a pixel by an OLED element.

A pixel has a unique response time required from a time point when a source signal corresponding to display data is applied, to emit light with a luminance corresponding to the level of the source signal.

In particular, when the difference between the display data of a previous frame and a current frame is large, the pixel requires a more time to emit light at a desired level. That is to say, when the level of the source signal of the previous frame is low and the level of the source signal of the current frame is high or when the level of the source signal of the previous frame is high and the level of the source signal of the current frame is low, the element of the pixel requires a more time to display a desired luminance.

When the pixel does not display brightness of a desired level within the driving time of a current frame, an afterimage in which a screen is blurred and overlapped may be displayed.

A display apparatus may adopt overdriving in order to eliminate the afterimage.

The overdriving is to provide the pixel with a source signal of a level higher than original display data. Display data may be compensated for overdriving, and a source signal may be provided to the pixel at a higher level in correspondence to the compensated display data. Therefore, the response time of the pixel may be improved, and as a result, the afterimage may be eliminated.

In general, frames for displaying a screen may be provided to have a constant frequency. In other words, a display panel may have a fixed frame frequency, and accordingly, a refresh rate may be fixed. Therefore, an overdriving value for overdriving may be provided on the basis of the fixed refresh rate.

However, a frame frequency may be changed as needed. For example, a frame frequency may be changed from 120 Hz to 60 Hz or may be changed from 60 Hz to 120 Hz. As such, if a frame frequency is changed, a refresh rate is changed. The change of a refresh rate means that a time for a source signal to be applied to a pixel is changed.

If an overdriving value is fixed and a refresh rate is decreased, a source signal may be excessively overdriven. As a result, an inverse afterimage may be formed on a screen. Also, if an overdriving value is fixed and a refresh rate is increased, a source signal may be insufficiently overdriven. As a result, an afterimage may be formed.

Thus, an overdriving value for overdriving needs to be appropriately controlled in correspondence to the change of a refresh rate depending on the change of a frame frequency.

SUMMARY

Various embodiments are directed to a timing controller of a display apparatus capable of controlling overdriving of display data in conformity with a refresh rate changed depending on a frame frequency.

In an embodiment, a timing controller of a display apparatus may include: an overdriving circuit configured to receive display data for each frame, and perform overdriving on the display data, wherein the overdriving circuit stores a plurality of lookup tables each of which has overdriving values each corresponding to a difference value between display data of consecutive frames and which correspond to refresh rates for the frames, wherein the overdriving circuit selects an overdriving value of a lookup table corresponding to a current refresh rate of the frames, as an overdriving control value, and wherein the overdriving circuit performs the overdriving on the display data by the overdriving control value.

In an embodiment, a timing controller of a display apparatus may include: an overdriving circuit configured to receive display data for each frame, and perform overdriving on the display data, wherein the overdriving circuit stores a plurality of lookup tables each of which has overdriving values each corresponding to a difference value between display data of consecutive frames and which correspond to refresh rates for the frames, wherein the overdriving circuit uses an interpolation value of overdriving values of lookup tables corresponding to refresh rates adjacent to a current refresh rate, as an overdriving control value, and wherein the overdriving circuit performs the overdriving on the display data by the overdriving control value.

In an embodiment, a timing controller of a display apparatus may include: an overdriving circuit configured to receive display data for each frame, and perform overdriving on the display data, wherein the overdriving circuit stores a lookup table corresponding to a reference refresh rate having an overdriving value corresponding to a difference value of display data of consecutive frames, wherein the overdriving circuit generates an overdriving control value by calculating a weight corresponding to a current refresh rate of the frames and the overdriving value corresponding to the difference value, and wherein the overdriving circuit performs the overdriving on the display data by the overdriving control value.

In an embodiment, a timing controller of a display apparatus may include: a data reception circuit configured to receive display data in which a refresh rate of frames is changed; an overdriving control unit configured to receive the display data received through the data reception circuit, detect a current refresh rate of the frames, check a difference value of first display data of a current frame and second display data of a previous frame, and provide an overdriving control value which is changed depending on the current refresh rate and the difference value; an overdriving processing unit configured to perform overdriving on the display data received through the data reception circuit, and control a level of the overdriving by the overdriving control value; and a data transmission circuit configured to transmit the display data overdriven in the overdriving processing unit.

The embodiments of the present disclosure may detect a refresh rate changed depending on a frame frequency, and may adjust an overdriving control value to be applied to overdriving of display data in conformity with a current refresh rate.

Therefore, the embodiments of the present disclosure may compensate display data for overdriving in conformity with a current refresh rate even when a frame frequency is changed.

That is to say, according to the embodiments of the present disclosure, even when a refresh rate is increased or decreased, overdriving may be controlled by display data compensated in conformity with a current refresh rate, and as a result, it is possible to prevent a reverse afterimage or afterimage from being formed on a screen.

DETAILED DESCRIPTION

Figure 1:
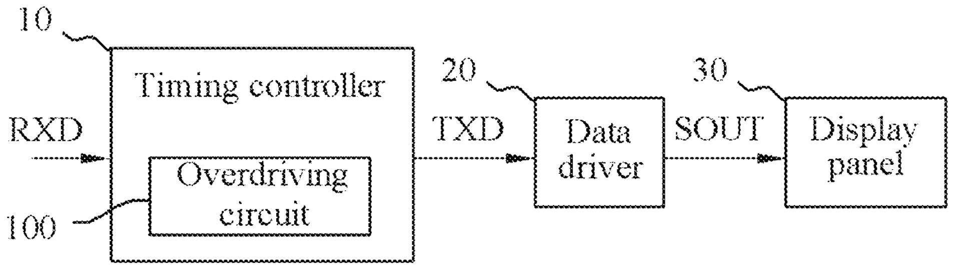
FIG. 1 is a block diagram illustrating a display apparatus in accordance with an embodiment of the present disclosure.

A display panel such as an LCD panel or an OLED panel may be driven by a display apparatus of the present disclosure illustrated in FIG. 1.

The display apparatus of FIG. 1 is exemplified as including a timing controller 10, a data driver 20 and a display panel 30. The timing controller 10 is illustrated as including an overdriving circuit 100.

The timing controller 10 is configured to receive display data RXD from an external data source, perform overdriving on the display data RXD by the overdriving circuit 100, and output display data TXD compensated by the overdriving.

The external data source may be understood as corresponding to various apparatuses or systems which provide data for display.

Overdriving means compensating display data to drive a source signal, provided from the data driver 20 to the pixel of the display panel 30, to a higher level.

In order for the overdriving, the overdriving circuit 100 may compensate the display data RXD by an overdriving control value, and may output display data TXD corresponding to a compensation result. It may be understood that the display data TXD after the overdriving is corrected to have a value capable of driving a source signal of a higher level compared to the display data RXD before the overdriving.

Figure 2:
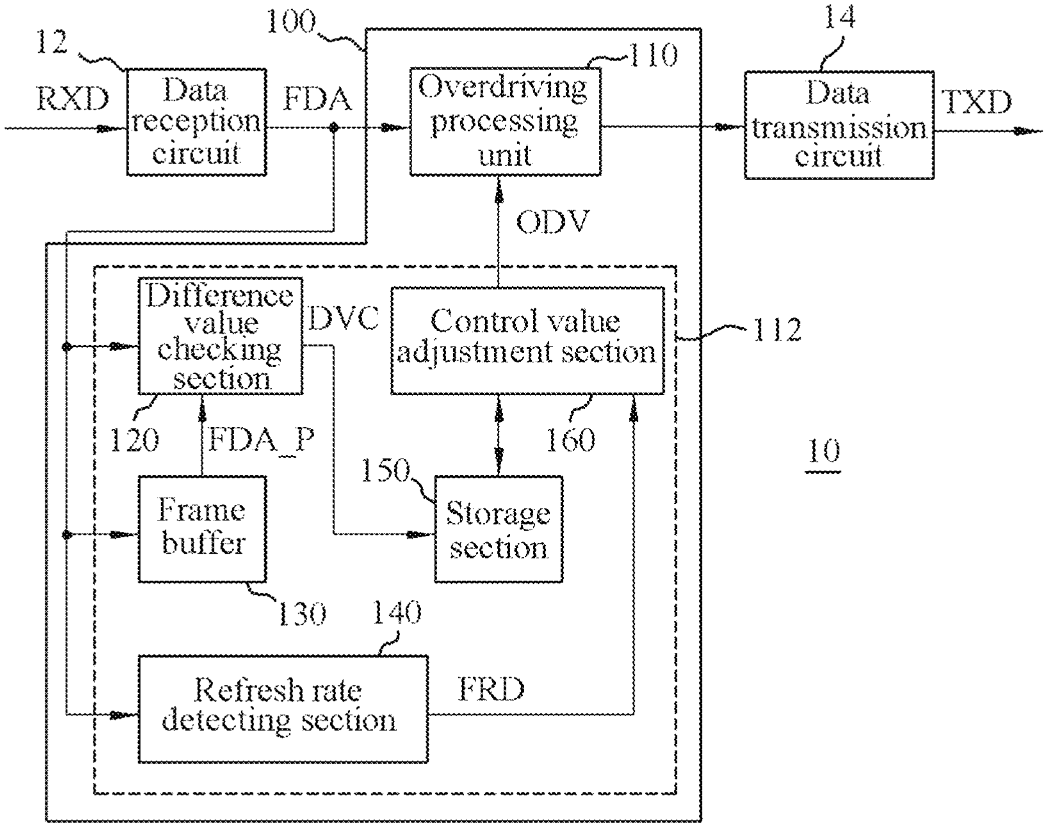
FIG. 2 is a detailed block diagram illustrating an embodiment of a timing controller illustrated in FIG. 1.

The configuration of the overdriving circuit 100 will be described later with reference to FIG. 2.

The timing controller 10 may configure the display data TXD, outputted from the overdriving circuit 100, as a packet, and may transmit the packet to the data driver 20. The timing controller 10 may transmit information (e.g., a vertical synchronization signal, etc.) necessary for the operation of the data driver 20 and the driving of the display panel 30, by including the information in the packet.

The data driver 20 is configured to receive the display data TXD outputted from the timing controller 10, generate a source signal SOUT corresponding to the display data TXD, and provide the source signal SOUT to the display panel 30.

The data driver 20 may include parts for restoring display data, parts for digital processing through a process such as latching, and parts for generating and outputting the analog source signal SOUT in response to the display data.

The data driver 20 may be understood as corresponding to a general source driver, and the illustration of the detailed configuration and the explanation of the operation of the data driver 20 will be omitted.

The source signal SOUT may have a voltage level corresponding to a specific grayscale voltage of a preset grayscale range. It may be understood that the voltage level of the source signal SOUT is determined by the value of the display data.

The display panel 30 is configured to include a plurality of pixels for displaying a screen, and the pixels may be disposed to have a plurality of columns and a plurality of rows for example. The source signal SOUT may be simultaneously provided to the columns. A row signal (not illustrated) may be sequentially provided to the rows. Therefore, the pixels may sequentially emit light by the unit of horizontal line.

According to an embodiment of the present disclosure, the source signal SOUT may have a level higher than a level corresponding to the display data RXD, due to the overdriving. The embodiment of the present disclosure is configured to overdrive the display data RXD to a level suitable for a current refresh rate corresponding to the change of a frame frequency when the overdriving circuit 100 operates.

The overdriving circuit 100 may be described with reference to FIG. 2. FIG. 2 is a detailed block diagram of the timing controller 10 illustrated in FIG. 1.

The timing controller 10 may be exemplified as including a data reception circuit 12, the overdriving circuit 100, and a data transmission circuit 14.

The data reception circuit 12 is configured to receive the display data RXD of the external data source, and output display data FDA in units of frames. The data reception circuit 12 is configured to provide the display data FDA to an overdriving processing unit 110, a difference value checking section 120, a frame buffer 130 and a refresh rate detecting section 140 of the overdriving circuit 100.

The data reception circuit 12 may receive the display data RXD in units of frames. The frame may be understood as the full size screen of the display panel 30.

The frequency of the frames displayed on the display panel 30 may be changed in consideration of the image quality of a screen. Namely, the refresh rate of the display panel 30 may be changed.

That is to say, an increase in the frame frequency means an increase in the refresh rate, and a decrease in the frame frequency means a decrease in the refresh rate. When the refresh rate is increased, the number of frames to be displayed for a predetermined time increases, and a time allocated to display one frame decreases. Conversely, when the refresh rate is decreased, the number of frames to be displayed for a predetermined time decreases, and a time allocated to display one frame increases.

The data reception circuit 12 may receive the display data RXD whose refresh rate is changed as described above.

The overdriving circuit 100 is configured to overdrive the display data FDA of frame unit provided from the data reception circuit 12, and provide display data whose value is compensated by the overdriving, to the data transmission circuit 14.

The data transmission circuit 14 is configured to output the display data TXD having a value compensated by the overdriving. The data transmission circuit 14 may configure the display data TXD as a packet, and the packet may be configured to include not only the display data TXD but also information (e.g., a vertical synchronization signal, etc.) necessary for the operation of the data driver 20 and the driving of the display panel 30.

In the above configuration, the overdriving circuit 100 may be exemplified as including the overdriving processing unit 110 and an overdriving control unit 112.

The overdriving processing unit 110 is configured to receive the display data FDA of frame unit through the data reception circuit 12 and receive an overdriving control value ODV from the overdriving control unit 112.

The overdriving processing unit 110 may perform the overdriving on the display data FDA by using the overdriving control value ODV, and may control an overdriving level by the overdriving control value ODV.

The overdriving processing unit 110 is configured to provide display data, having a value corrected by the overdriving, to the data transmission circuit 14.

The overdriving control unit 112 is configured to receive the display data FDA of frame unit from the data reception circuit 12, generate the overdriving control value ODV using the display data FDA, and provide the overdriving control value ODV to the overdriving processing unit 110.

In more detail, the overdriving control unit 112 is configured to detect a current refresh rate of frames by the display data FDA, check a difference value between first display data of a current frame and second display data of a previous frame, and provide the overdriving control value ODV which is changed depending on the current refresh rate and the difference value. The first display data of the current frame may be understood as the display data FDA provided from the data reception circuit 12, and the second display data of the previous frame may be understood as the display data FDA provided from the data reception circuit 12 during a previous frame cycle. In the following description, the first display data of the current frame will be denoted as display data FDA, and the second display data of the previous frame will be denoted as display data FDA_P.

In order to check a difference value DVC between the display data FDA of the current frame and the display data FDA_P of the previous frame, the overdriving control unit 112 may include the difference value checking section 120 and the frame buffer 130.

The frame buffer 130 is configured to update the display data FDA, provided from the data reception circuit 12, at a frame cycle.

In other words, the frame buffer 130 stores the display data FDA_P of the previous frame, and when the display data FDA of the current frame is received, provides the display data FDA_P of the previous frame to the difference value checking section 120 and then stores the display data FDA of the current frame.

The difference value checking section 120 is configured to receive the display data FDA of the current frame provided from the data reception circuit 12 and the display data FDA_P of the previous frame from the frame buffer 130, and output the difference value DVC. In more detail, the difference value checking section 120 may calculate the difference between a value of the display data FDA_P of the previous frame and a value of the display data FDA of the current frame, and may output the difference value DVC as a calculation result.

In order to detect a current refresh rate of frames, the overdriving control unit 112 may include the refresh rate detecting section 140.

For example, the refresh rate detecting section 140 may detect a refresh rate according to a frame frequency, by counting the display data FDA for each frame.

Namely, the refresh rate detecting section 140 may be configured to detect a current refresh rate and output a refresh rate value FRD corresponding to the current refresh rate.

The overdriving control unit 112 is configured to provide the overdriving control value ODV which is changed depending on the current refresh rate detected by the refresh rate detecting section 140 and the difference value DVC of the difference value checking section 120. To this end, the overdriving control unit 112 may include a storage section 150 and a control value adjustment section 160.

In the present disclosure, the storage section 150 and the control value adjustment section 160 may be variously implemented.

First, as a first embodiment, the present disclosure may be configured such that the overdriving control unit 112 stores a plurality of lookup tables for respective refresh rates, selects a lookup table conforming to a refresh rate and provides the overdriving control value ODV.

To this end, the storage section 150 is configured to store the plurality of lockup tables each having an overdriving value corresponding to the difference value DVC and corresponding to the refresh rates, respectively. This will be described with reference to FIG. 3.

For example, the storage section 150 may be configured to store a first lookup table TA1 corresponding to a refresh rate corresponding to a frame frequency of 40 Hz, a second lookup table TA2 corresponding to a refresh rate corresponding to a frame frequency of 60 Hz and a third lookup table TAn corresponding to a refresh rate corresponding to a frame frequency of 120 Hz.

Each of the lookup tables TA1, TA2 and TAn may have overdriving values corresponding to various difference values DVC, respectively. For example, each of the lookup tables TA1, TA2 and TAn may store overdriving values respectively corresponding to difference values DVC corresponding to a 64 grayscale difference, a 96 grayscale difference, a 128 grayscale difference, a 192 grayscale difference and a 256 grayscale difference, respectively.

The storage section 150 is configured to provide an overdriving value selected by the difference value DVC in a lookup table selected by the refresh rate value FRD of the control value adjustment section 160, in response to a request of the control value adjustment section 160.

The control value adjustment section 160 is configured to select a lookup table corresponding to the refresh rate value FRD in the storage section 150 and provide the overdriving control value ODV corresponding to the difference value DVC of the selected lookup table, to the overdriving processing unit 110.

To this end, the control value adjustment section 160 may receive the refresh rate value FRD, provide the refresh rate value FRD to the storage section 150 and thereby request the storage section 150 to provide an overdriving value.

In response to the request, the storage section 150 may provide an overdriving value corresponding to the difference value DVC in a lookup table for a refresh rate corresponding to the refresh rate value FRD. For example, when the difference value DVC corresponding to the 256 grayscale difference is provided to the storage section 150 and the refresh rate value FRD corresponding to the frame frequency of 120 Hz is provided to the control value adjustment section 160, the storage section 150 may provide an overdriving value corresponding to the difference value DVC corresponding to the 256 grayscale difference in the third lookup table TAn corresponding to the refresh rate value FRD.

The control value adjustment section 160 may provide the overdriving value received by providing the refresh rate value FRD to the storage section 150, as the overdriving control value ODV.

As a result, the overdriving processing unit 110 may perform overdriving on the display data FDA of a current frame by the overdriving control value ODV provided from the control value adjustment section 160.

As a second embodiment, the present disclosure may be configured such that the overdriving control unit 112 stores a plurality of lookup tables for respective refresh rates, generates an interpolation value in conformity with a refresh rate and provides the interpolation value as the overdriving control value ODV.

Figure 3:
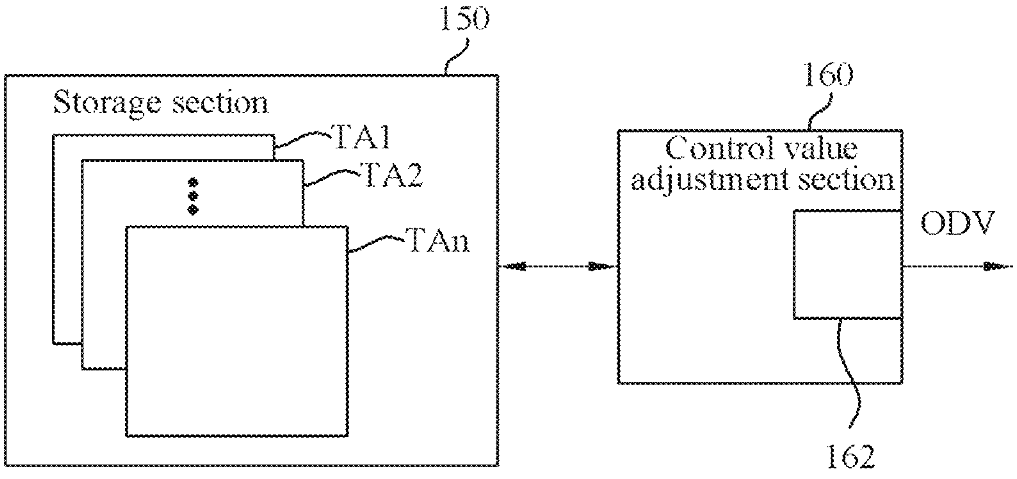
FIG. 3 is a detailed block diagram illustrating an example of a storage section and a control value adjustment section.

The second embodiment may be described with reference to FIG. 3.

In the second embodiment, the overdriving control unit 112 is configured to select lookup tables adjacent to a current refresh rate by the refresh rate value FRD, select overdriving values corresponding to the difference value DVC in the selected lookup tables, generate an interpolation value of the selected overdriving values and provide the interpolation value as the overdriving control value ODV.

To this end, the storage section 150 stores lookup tables for interpolation. The lookup tables for interpolation may be understood as the first lookup table TA1 corresponding to a refresh rate corresponding to a frame frequency of 40 Hz, the second lookup table TA2 corresponding to a refresh rate corresponding to a frame frequency of 60 Hz and the third lookup table TAn corresponding to a refresh rate corresponding to a frame frequency of 120 Hz described in the first embodiment. Overdriving values stored in each of the lookup tables TA1, TA2 and TAn may be understood by the description of the first embodiment.

The storage section 150 is configured to select lookup tables corresponding to refresh rates adjacent to the current refresh rate of the refresh rate value FRD of the control value adjustment section 160 and provide overdriving values of the selected lookup tables corresponding to the difference value DVC.

To this end, the control value adjustment section 160 may receive the refresh rate value FRD, provide the refresh rate value FRD to the storage section 150 and thereby request the storage section 150 to provide overdriving values.

In response to the request, the storage section 150 may provide overdriving values corresponding to the difference value DVC in the lookup tables corresponding to the refresh rates adjacent to the current refresh rate corresponding to the refresh rate value FRD.

For example, when the current refresh rate corresponds to between the frame frequency of 60 Hz and the frame frequency of 120 Hz, the storage section 150 may select the second lookup table TA2 and the third lookup table TAn adjacent to the current refresh rate by the refresh rate value FRD, and may provide overdriving values of the selected second lookup table TA2 and third lookup table TAn corresponding to the difference value DVC, in response to a request of the control value adjustment section 160.

The control value adjustment section 160 receives the overdriving values received by providing the refresh rate value FRD to the storage section 150. The overdriving values may be understood as overdriving values, corresponding to the difference value DVC, of lookup tables corresponding to refresh rates adjacent to a current refresh rate.

The control value adjustment section 160 is configured to generate an interpolation value of the overdriving values received as described above, and provide the interpolation value as the overdriving control value ODV.

As a result, the overdriving processing unit 110 may perform overdriving on the display data FDA of a current frame by the overdriving control value ODV provided from the control value adjustment section 160.

As a third embodiment, the present disclosure may be configured such that the overdriving control unit 112 stores a reference lookup table for a refresh rate and provides the overdriving control value ODV by applying a weight corresponding to a current refresh rate to an overdriving value.

Figure 4:
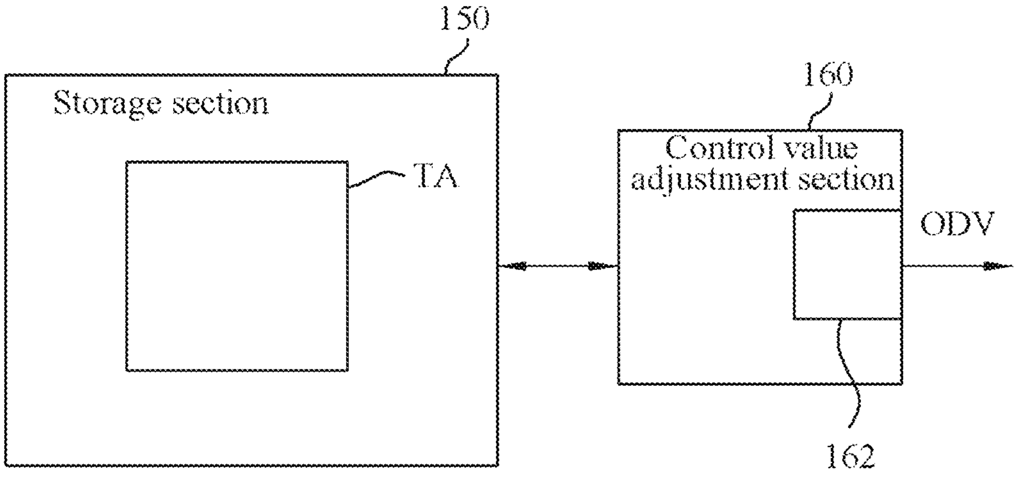
FIG. 4 is a detailed block diagram illustrating another example of a storage section and a control value adjustment section.

To this end, the storage section 150 is configured to store a reference lookup table TA having overdriving values corresponding to the difference value DVC. This will be described with reference to FIG. 4.

For example, the storage section 150 may be configured to store the reference lookup table TA corresponding to a refresh rate corresponding to a frame frequency of 60 Hz.

The reference lookup table TA may have overdriving values corresponding to the difference value DVC. For example, the reference lookup table TA may store overdriving values corresponding to difference values DVC corresponding to a 64 grayscale difference, a 96 grayscale difference, a 128 grayscale difference, a 192 grayscale difference and a 256 grayscale difference.

The storage section 150 is configured to provide an overdriving value selected by the difference value DVC in the reference lookup table TA, in response to a request of the control value adjustment section 160.

The control value adjustment section 160 is configured to use the refresh rate value FRD as a weight and provide the overdriving control value ODV obtained by calculating the weight and an overdriving value corresponding to the difference value DVC.

To this end, the control value adjustment section 160 may receive the refresh rate value FRD, provide the refresh rate value FRD to the storage section 150 and thereby request the storage section 150 to provide an overdriving value.

In response to the request, the storage section 150 may provide an overdriving value corresponding to the difference value DVC in the reference lookup table TA.

The control value adjustment section 160 may use the refresh rate value FRD as a weight, and may provide the overdriving control value ODV obtained by calculating the weight and the overdriving value received from the storage section 150 in correspondence to the difference value DVC.

By the above description, it may be seen that the refresh rate value FRD is used as a weight for converting the overdriving value of the reference lookup table TA in conformity with a current refresh rate.

As a result, the overdriving processing unit 110 may perform overdriving on the display data FDA of a current frame by the overdriving control value ODV provided from the control value adjustment section 160.

In the first to third embodiments of the present disclosure described above with reference to FIGS. 1 to 4, the overdriving control unit 112 may output the overdriving control value ODV to have a hysteresis characteristic. To this end, the control value adjustment section 160 may include a Schmitt trigger circuit 162 which has a hysteresis characteristic, and may be configured to output the overdriving control value ODV through the Schmitt trigger circuit 162.

When a source signal applied to a pixel continuously changes according to a refresh rate, an abnormal phenomenon may occur on a screen. It may be understood that the hysteresis characteristic of the overdriving control unit 112 is to prevent an abnormality of the screen by mitigating the change of the source signal.

The above-described embodiments of the present disclosure may appropriately control overdriving on the basis of a current refresh rate in correspondence to a change in frame frequency.

This will be described below with reference to FIGS. 5 to 8.

In FIGS. 5 to 8, the display data of a third frame and a fourth frame have significantly higher values than the display data of a first frame and a second frame. Therefore, the luminances of the third frame and the fourth frame have significantly higher values than the luminances of the first frame and the second frame.

Figure 5:
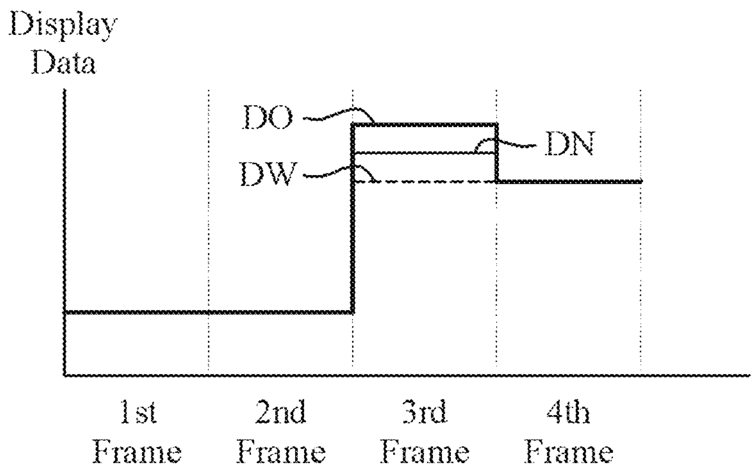
FIG. 5 is a graph explaining the control of display data for overdriving when a refresh rate is increased.
Figure 6:
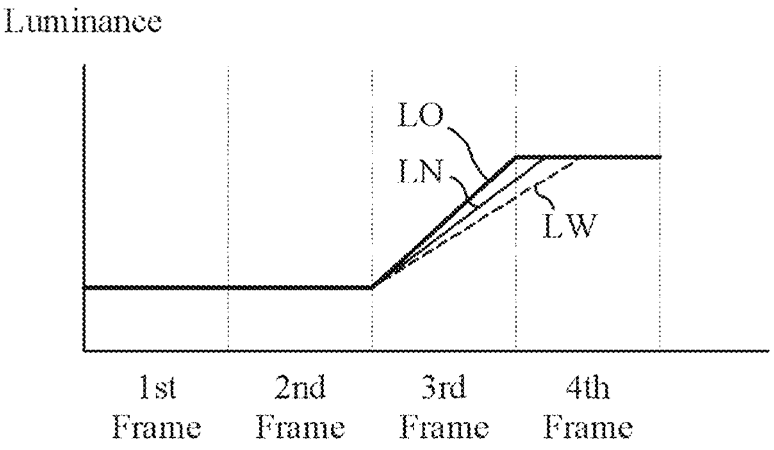
FIG. 6 is a graph illustrating that a luminance is changed by the control of display data for overdriving when a refresh rate is increased.
Figure 7:
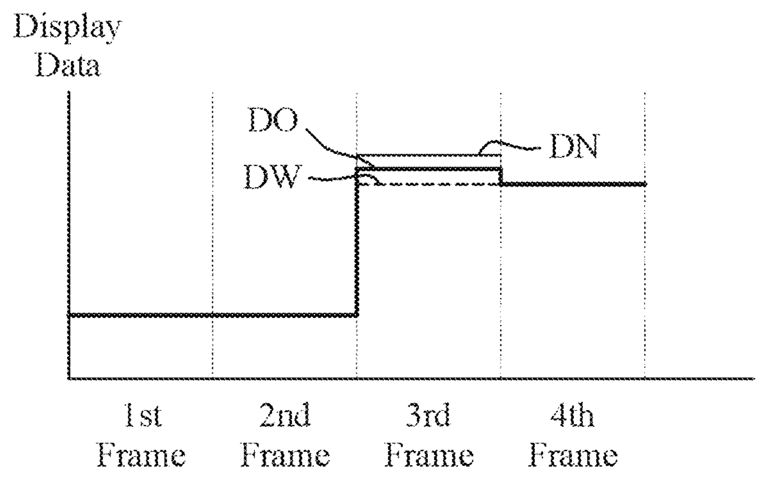
FIG. 7 is a graph explaining the control of display data for overdriving when a refresh rate is decreased.

In FIGS. 5 and 7, DW indicates display data with no overdriving, DN indicates display data of a value overdriven by an overdriving control value ODV fixed irrespective of a change in refresh rate, and DO indicates display data of a value overdriven by an overdriving control value ODV changed by a current refresh rate according to the embodiment of the present disclosure. Also, in FIGS. 6 and 8, LW indicates a luminance by the display data DW, LN indicates a luminance by the display data DN, and LO indicates a luminance by the display data DO.

FIGS. 5 and 6 are graphs for explaining the change of display data and the resultant change of a luminance by the overdriving of the embodiment of the present disclosure according to a change from a low frame frequency (e.g., 60 Hz) to a high frame frequency (e.g., 120 Hz).

A large difference change in display data between the second frame and the third frame as illustrated in FIGS. 5 and 6 may have difficulty in expressing a sufficient luminance even at a refresh rate corresponding to a frame frequency of 60 Hz.

In this consideration, the display data DW should be overdriven to express a sufficient luminance at the refresh rate corresponding to the frame frequency of 60 Hz. In other words, the display data DW is changed to the display data DN by the overdriving control value ODV corresponding to the refresh rate corresponding to the frame frequency of 60 Hz. It may be understood that the display data DN has a compensated value to drive a source signal to a higher level so as to express a sufficient luminance.

However, if the frame frequency is increased to 120 Hz and the refresh rate is increased, the display data DN which is changed to suit the refresh rate of the frame frequency of 60 Hz may have difficulty in expressing a desired luminance within a shorter period.

As described above with reference to FIGS. 1 to 4, the embodiment of the present disclosure generates the overdriving control value ODV suitable for a current refresh rate according to a change in refresh rate corresponding to a change in frame frequency.

In detail, the overdriving control value ODV corresponding to the frame frequency of 120 Hz may have a larger value than the overdriving control value ODV corresponding to the frame frequency of 60 Hz. Namely, as shown in FIG. 5, the display data DO may be overdriven to have a larger value than the display data DN overdriven in correspondence to the frame frequency of 60 Hz.

When the display data DO is overdriven to have a larger value as described above, a luminance may be sufficiently expressed within the driving period of a source signal as indicated by LO in FIG. 6.

Accordingly, in the present disclosure, even when a refresh rate is increased, display data may be provided such that a source signal can be overdriven to a sufficient level within a decreased driving time, and as a result, an afterimage formed by an insufficient luminance may be prevented.

Figure 8:
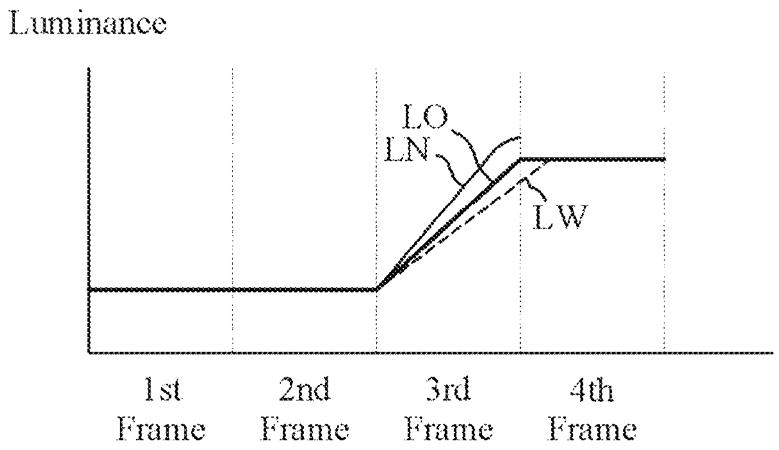
FIG. 8 is a graph illustrating that a luminance is changed by the control of display data for overdriving when a refresh rate is decreased.

FIGS. 7 and 8 are graphs for explaining the change of display data and the resultant change of a luminance by the overdriving of the embodiment of the present disclosure according to a change from a high frame frequency (e.g., 60 Hz) to a low frame frequency (e.g., 40 Hz).

If the frame frequency is decreased to 40 Hz and accordingly the refresh rate is decreased, the display data DN which is overdriven to suit the refresh rate of the frame frequency of 60 Hz may have difficulty in expressing a desired luminance within a longer period.

When display data maintains the display data DN and the overdriving control value ODV corresponding to the frame frequency of 60 Hz despite the decrease in frame frequency, a luminance may be excessively expressed by the display data DN overdriven as indicated by LN in FIG. 8.

As described above with reference to FIGS. 1 to 4, the embodiment of the present disclosure generates the overdriving control value ODV suitable for a current refresh rate according to a change in refresh rate corresponding to a change in frame frequency.

In detail, the overdriving control value ODV corresponding to the frame frequency of 40 Hz may have a smaller value than the overdriving control value ODV corresponding to the frame frequency of 60 Hz. Namely, as shown in FIG. 7, the display data DO may be overdriven to have a smaller value than the display data DN overdriven in correspondence to the frame frequency of 60 Hz.

When the display data DO is overdriven to have a smaller value as described above, a luminance may be unexcessively and appropriately expressed within the driving period of a source signal as indicated by LO in FIG. 8.

Accordingly, in the present disclosure, even when a refresh rate is decreased, display data may be provided such that a source signal can be unexcessively overdriven to an appropriate level within an increased driving time, and as a result, a reverse afterimage formed by an excessive luminance may be prevented.

As is apparent from the above description, the present disclosure may adjust overdriving of display data in conformity with a current refresh rate that is changed depending on a frame frequency.

Therefore, according to the embodiments of the present disclosure, even when a refresh rate is increased or decreased, overdriving may be controlled by display data compensated in conformity with a current refresh rate, and as a result, it is possible to prevent a reverse afterimage or afterimage from being formed on a screen.

What is claimed is:

1. A timing controller of a display apparatus, comprising:

an overdriving circuit configured to receive display data for each frame, and perform overdriving on the display data, wherein the overdriving circuit is configured to store a plurality of lookup tables each of which has overdriving values each corresponding to a grayscale difference between display data of consecutive frames and which correspond to refresh rates for the frames, wherein the overdriving circuit is configured to select an overdriving value of a lookup table corresponding to a current refresh rate of the frames, as an overdriving control value, and wherein the overdriving circuit is configured to perform the overdriving on the display data by the overdriving control value.

2. The timing controller according to claim 1, wherein the overdriving circuit comprises:

an overdriving control unit configured to store the plurality of lookup tables, detect the current refresh rate of the frames, and provide the overdriving value of the lookup table corresponding to the current refresh rate, as the overdriving control value; and an overdriving processing unit configured to perform the overdriving on the display data by the overdriving control value.

3. The timing controller according to claim 2, wherein the overdriving control unit comprises:

a storage section configured to store the plurality of lookup tables;

a refresh rate detecting section configured to detect the current refresh rate by the display data for each frame, and provide a refresh rate value as a detection result; and a control value adjustment section configured to select the lookup table corresponding to the refresh rate value in the storage section, and provide the overdriving value of the selected lookup table as the overdriving control value.

4. The timing controller according to claim 3, wherein the overdriving control unit further comprises:

a frame buffer configured to store first display data of a previous frame; and a difference value checking section configured to receive the first display data of the previous frame and second display data of a current frame, and output the grayscale difference of the first display data and the second display data, wherein the storage section is configured to provide the overdriving value corresponding to the grayscale difference of the lookup table corresponding to the refresh rate value, to the control value adjustment section.

5. The timing controller according to claim 4, wherein the storage section is configured to:

store the plurality of lookup tables, store a plurality of overdriving values selectable according to the grayscale difference, in each lookup table, select the lookup table by the refresh rate value, and select the overdriving value corresponding to the grayscale difference in the selected lookup table and provide the overdriving value to the control value adjustment section.

6. The timing controller according to claim 2, wherein the overdriving control unit is configured to output the overdriving control value through a Schmitt trigger circuit which has a hysteresis characteristic.

7. A timing controller of a display apparatus, comprising:

a data reception circuit configured to receive display data in which a refresh rate of frames is changed;

an overdriving control unit configured to receive the display data received through the data reception circuit, detect a current refresh rate of the frames, check a grayscale difference of first display data of a current frame and second display data of a previous frame, and provide an overdriving control value which is changed depending on the current refresh rate and the grayscale difference;

an overdriving processing unit configured to perform overdriving on the display data received through the data reception circuit, and control a level of the overdriving by the overdriving control value; and a data transmission circuit configured to transmit the display data overdriven in the overdriving processing unit.

8. The timing controller according to claim 7, wherein the overdriving control unit is configured to:

store a plurality of lookup tables each of which has overdriving values each corresponding to the grayscale difference and which correspond to the refresh rates, generate the grayscale difference of the first display data and the second display data, generate a refresh rate value by detecting the current refresh rate by the display data, select a lookup table corresponding to the refresh rate value, select the overdriving value corresponding to the grayscale difference in the selected lookup table, and provide the selected overdriving value as the overdriving control value.

9. The timing controller according to claim 7, wherein the overdriving control unit is configured to:

store a plurality of lookup tables each of which has overdriving values each corresponding to the grayscale difference and which correspond to the refresh rates, generate the grayscale difference of the first display data and the second display data, generate a refresh rate value by detecting the current refresh rate by the display data, select lookup tables adjacent to the current refresh rate by the refresh rate value, select overdriving values corresponding to the grayscale difference in the selected lookup tables, generate an interpolation value of the selected overdriving values, and provide the interpolation value as the overdriving control value.

10. The timing controller according to claim 7, wherein the overdriving control unit is configured to:

store a lookup table corresponding to a reference refresh rate having an overdriving value corresponding to the grayscale difference, generate the grayscale difference value of the first display data and the second display data, generate a refresh rate value by detecting the current refresh rate by the display data, select an overdriving value corresponding to the grayscale difference, and use the refresh rate value as a weight, and provide the overdriving control value by calculating the weight and the overdriving value corresponding to the grayscale difference.

* * * * *